United States Patent
Zhuang et al.

(10) Patent No.: US 10,037,156 B1
(45) Date of Patent: Jul. 31, 2018

(54) TECHNIQUES FOR CONVERGING METRICS FOR FILE- AND BLOCK-BASED VVOLS

(71) Applicant: EMC IP Holding Company, LLC, Hopkinton, MA (US)

(72) Inventors: Peiyu Zhuang, Shanghai (CN); Minjie Zhang, Shanghai (CN); Arun Joseph, Raleigh, NC (US); Yue Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 15/282,203

(22) Filed: Sep. 30, 2016

(51) Int. Cl.
  G06F 12/00 (2006.01)
  G06F 13/00 (2006.01)
  G06F 3/06 (2006.01)
  G06F 9/455 (2018.01)

(52) U.S. Cl.
  CPC ......... *G06F 3/0619* (2013.01); *G06F 3/0611* (2013.01); *G06F 3/0665* (2013.01); *G06F 3/0689* (2013.01); *G06F 9/45558* (2013.01); G06F 2009/45562 (2013.01); G06F 2009/45583 (2013.01)

(58) Field of Classification Search
  None
  See application file for complete search history.

(56) References Cited

U.S. PATENT DOCUMENTS

| | | | |
|---|---|---|---|
| 8,627,275 B1 | 1/2014 | Belov et al. | |
| 8,700,832 B1 | 4/2014 | Ramakrishnan et al. | |
| 8,751,757 B1 | 6/2014 | Gaikwad et al. | |
| 9,432,476 B1 | 8/2016 | Dong et al. | |
| 9,588,799 B1 | 3/2017 | Burruss et al. | |
| 9,613,053 B1 | 4/2017 | Shusharin et al. | |
| 9,632,927 B2* | 4/2017 | Camp | G06F 12/0253 |
| 9,811,527 B1* | 11/2017 | Esposito | G06F 17/30174 |
| 2005/0182890 A1* | 8/2005 | Yamagami | G06F 3/0605 711/4 |
| 2007/0248017 A1* | 10/2007 | Hinata | G06F 3/061 370/238 |
| 2008/0313641 A1* | 12/2008 | Inoue | G06F 3/061 718/104 |
| 2012/0005449 A1* | 1/2012 | Reed | G06F 3/0607 711/171 |
| 2012/0197624 A1* | 8/2012 | Hawargi | G06F 3/0604 703/21 |

(Continued)

OTHER PUBLICATIONS

Alon Grubshtein, et al.; "Data Storage System Performance Monitoring Using Time-Series Analysis," U.S. Appl. No. 14/750,268, filed Jun. 25, 2015.

(Continued)

*Primary Examiner* — Sean D Rossiter (74) *Attorney, Agent, or Firm* — BainwoodHuang (57) ABSTRACT

Techniques for visualizing performance of file-based VVols and block-based VVols for aiding in administration of a data storage system operating in a virtualization environment allow performance of these different types of VVols to be visualized side-by-side using a common set of performance metrics. Thus, in one embodiment, the performances of file-based and block-based VVols are both converted into a mutually-compatible format and rendered for display together on screen.

20 Claims, 6 Drawing Sheets

(56) References Cited

U.S. PATENT DOCUMENTS

| | | | | |
|---|---|---|---|---|
| 2013/0179636 A1* | 7/2013 | Shirasu | G06F 3/0605 | 711/117 |
| 2013/0246726 A1* | 9/2013 | Kirstenpfad | G06F 17/30067 | 711/162 |
| 2014/0189692 A1* | 7/2014 | Wang | H04W 4/00 | 718/1 |
| 2014/0281221 A1* | 9/2014 | Wang | G06F 3/065 | 711/114 |
| 2015/0261462 A1 | 9/2015 | Miwa et al. | | |
| 2016/0093387 A1* | 3/2016 | Oh | G11C 16/16 | 365/185.11 |
| 2017/0160928 A1* | 6/2017 | Jaffari | G06F 3/061 | |
| 2017/0185298 A1* | 6/2017 | Camp | G06F 3/061 | |
| 2018/0013675 A1* | 1/2018 | Nellikar | G06F 9/45558 | |

OTHER PUBLICATIONS

Alan L. Taylor, et al.; "Managing Data Storage Migration for Virtual Machines," U.S. Appl. No. 14/754,961, filed Jun. 30, 2015.

Pei Yu Zhuang, et al.; "Providing Metric Data for a Data Storage System Through a Representational State Transfer (Restful) Application Programming Interface (API)," U.S. Appl. No. 14/867,389, filed Sep. 28, 2015.

Saar Cohen, et al.; "Non-Disrputively Migrating Virtual Disks Using Virutalization Appliance," U.S. Appl. No. 14/984,219, filed Dec. 30, 2015.

Dilesh Naik, et al.; "Lun With Zero Storage As a Protocol Endpoint," U.S. Appl. No. 14/985,960, filed Dec. 31, 2015.

Shuyu Lee, et al.; "Protocol Endpoint Object Duality," U.S. Appl. No. 14/986,066, filed Dec. 31, 2015.

Sergey Alexandrovich Alexeev, et al.; "Virtual Machine Storage Management Queue," U.S. Appl. No. 15/318,936, filed Dec. 14, 2016.

Minjie Zhang, et al.; "Monitoring Performance of Transient Virtual Volumes Created for a Virtual Machine," U.S. Appl. No. 15/278,646, filed Sep. 28, 2016.

Arun Joseph, et al.; "Techniques for Aggregating Metrics for VVols Within a Storage Container," U.S. Appl. No. 15/282,190, filed Sep. 30, 2016.

\* cited by examiner

TECHNIQUES FOR CONVERGING METRICS FOR FILE- AND BLOCK-BASED VVOLS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Virtual machines execute dynamically on hosts running hypervisors to provide high availability and scalability to cloud-based services. These virtual machines often make use of logical volumes that are stored in backend data storage systems. One platform for virtual machines is vSphere provided by VMware, Inc. based in Palo Alto, Calif. This platform provides for Virtual Volumes (VVols), which may be deployed on data storage systems and accessed by hosts. Performance of these VVols can be viewed and visualized for the convenience of system administrators. In addition, VVols are available in two varieties: file-based VVols, which are accessed using file-based protocols, and block-based VVols, which are accessed using block-based protocols.

SUMMARY

Unfortunately, although system administrators are able to visualize performance of individual VVols, there are deficiencies. For example, performance characteristics of file-based and block-based VVols are reported using different schemes, so it is not currently possible to visualize a comparison between performance of file-based VVols and block-based VVols even within the same data storage system. As an additional example, even though VVols can be grouped into storage containers for management and provisioning purposes, it is currently not possible to view performance of a storage container as a whole. Thus, it can be difficult to determine if the data storage system and its storage containers require reconfiguration.

In contrast with prior approaches, improved techniques for visualizing performance of VVols in a data storage system operating in a virtualization environment allow performance to be visualized in a highly-flexible manner. Thus, in one embodiment, the performance of file-based and block-based VVols are converted into a mutually-compatible format and rendered for display together on screen. In another embodiment, the performances of all VVols within a storage container are aggregated together for easy comparison among different storage containers. Advantageously, these techniques improve the experience of users, allowing users to more easily determine whether aspects of the data storage system should be reconfigured.

One embodiment is directed to a method, performed by a computing device, of administering storage for virtual machines running on a set of host devices, the storage being provided by a data storage system. The method includes, while the data storage system is operating to process storage requests from the virtual machines running on the set of host devices, (a) receiving, from the data storage system, at respective intervals, first count data over a network, the first count data for each interval including a first set of count-based performance metrics regarding processing by the data storage system of block-based data storage requests directed to a first logical disk during that respective interval, the first logical disk providing storage for a first virtual machine, (b) receiving, from the data storage system, at respective intervals, second count data over the network, the second count data for each interval including a second set of count-based performance metrics regarding processing by the data storage system of file-based data storage requests directed to a second logical disk during that respective interval, the second logical disk providing storage for a second virtual machine, the second set of count-based performance metrics including counts of different characteristics from those included in the first set of count-based performance metrics, (c) generating, for each respective interval of the first count data, a first set of rate metrics for the block-based storage requests directed to the first logical disk, the first set of rate metrics being generated based on the first set of count-based performance metrics and a length of that respective interval, (d) generating, for each respective interval of the second count data, a second set of rate metrics for the file-based storage requests directed to the second logical disk, the second set of rate metrics being generated based on the second set of count-based performance metrics and a length of that respective interval, each rate metric of the second set of rate metrics describing a same performance characteristic in a same format as a corresponding rate metric of the first set of rate metrics, and (e) rendering, for simultaneous display to a user on a display device, rate metrics of the first set of rate metrics with respect to the first logical disk as well as rate metrics of the second set of rate metrics with respect to the second logical disk. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Improved techniques for visualizing performance of VVols in a data storage system operating in a virtualization environment allow performance to be visualized in a highly-flexible manner. Thus, in one embodiment, the performances of file-based and block-based VVols are converted into a mutually-compatible format and rendered for display together on screen. In another embodiment, the performances of all VVols within a storage container are aggregated together for easy comparison among different storage containers. Advantageously, these techniques improve the experience of users, allowing users to more easily determine whether aspects of the data storage system should be reconfigured.

Description of Environment and Apparatuses

Figure 1:
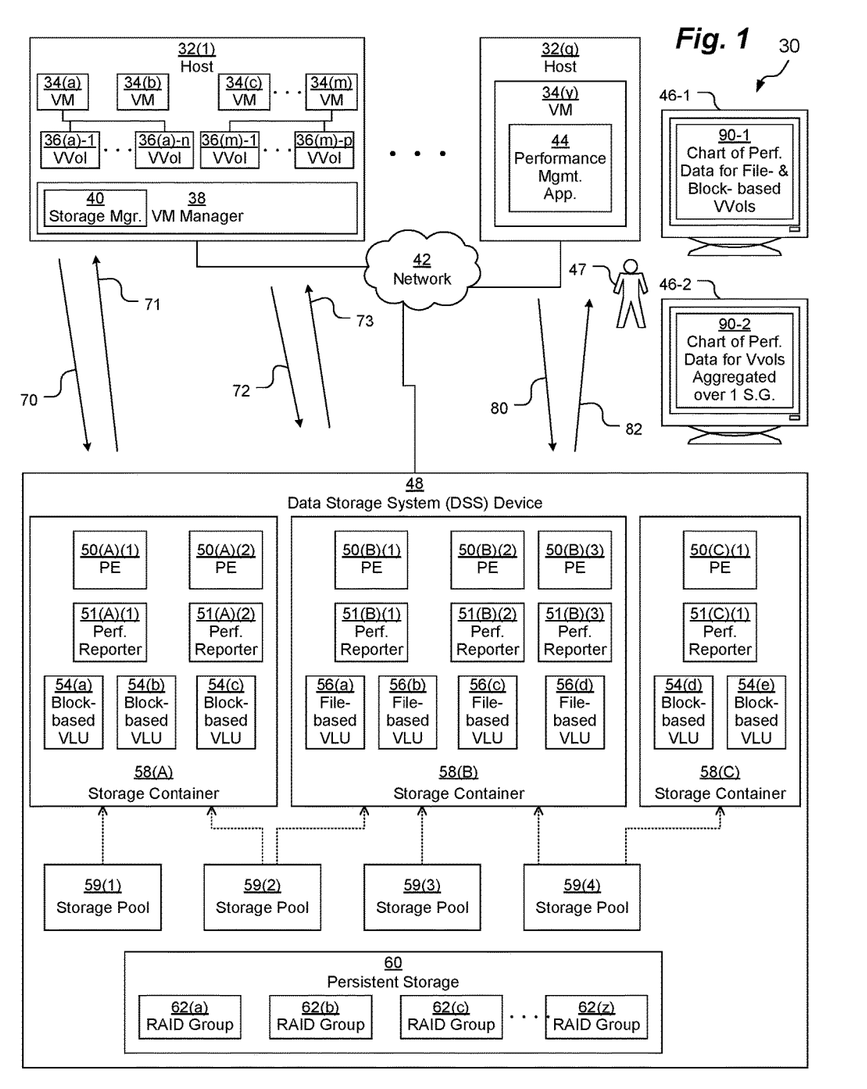
FIG. 1 is a block diagram depicting a logical view of an example system according to various embodiments.

FIG. 1 shows an example environment 30 in which embodiments of the improved techniques hereof can be practiced. Here, one or more host computing devices ("hosts") 32 (depicted as hosts 32(1), . . . , 32(q)) access one or more data storage system devices 48 over a network 42. The data storage system 48 includes processing circuitry, network interface circuitry, memory, interconnection circuitry, and storage interface circuitry (not depicted) as well as persistent storage 60.

Persistent storage 60 may include one or more of any kind of storage device (not depicted) able to persistently store data, such as, for example, a magnetic hard disk drive, a solid state storage device (SSD), etc. As depicted, persistent storage 60 is arranged as a plurality of RAID groups 62 (depicted as RAID groups 62(a), 62(b), 62(c), . . . , 62(z)). Each RAID group 62 is made up of one or more storage devices, which may logically combine to create a logical disk having larger size or redundancy features or both, depending on the RAID level, as is well-known in the art. Each RAID group 62 may be partitioned into one or more volumes (not depicted), which may be further partitioned into a plurality of slices (not depicted), typically 256 megabytes or 1 gigabyte in size, for example. Slices from one or more RAID groups 62 may be logically combined to create host-accessible volumes. The slices are each assigned to a storage pool 59 (depicted as storage pools 59(1), 59(2), 59(3), 59(4), for example), typically based on respective performance characteristics. Thus, for example, storage pools 59(1), 59(3) may be high performance pools whose slices are backed by high-speed SSDs, while storage pool 59(2) may be a low performance pool whose slices are backed by low-speed magnetic hard disks, and storage pool 59(3) may be a medium performance pool whose slices are backed by high-speed magnetic hard disks having flash-based caches.

The network 42 may be any type of network or combination of networks, such as a storage area network (SAN), a local area network (LAN), a wide area network (WAN), the Internet, and/or some other type of network or combination of networks, for example. The hosts 32 may connect to the data storage systems 48 using various technologies, such as Fibre Channel, iSCSI, NFS, SMB 3.0, and CIFS, for example. Any number of hosts 32 may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the data storage system 48 is configured to receive I/O requests according to both block-based and file-based protocols and to respond to such I/O requests by reading or writing to the persistent storage 60.

The data storage system 48 may include multiple storage processors (not depicted). Each storage processor may include its own instance of the processing circuitry, network interface circuitry, storage interface circuitry, and memory. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Host 32(1) represents an example typical host 32. Host 32(1) runs a virtual machine (VM) management application 38, which manages a plurality of VMs 34 (depicted as VMs 34(a), 34(b), 34(c), . . . , 34(m)) executing on one or more processors (not depicted) of the host 32(a). VM management application 38 may include a hypervisor, as is well-known in the art. Each VM 34 may be associated with one or more virtual storage volumes such as VVols 36. As depicted, VM 34(a) is able to access VVols 36(a)-1, . . . , 36(a)-n, while VM 34(m) is able to access VVols 36(m)-1, . . . , 36(m)-p. These VVols 36 are not actually present on host 32(1), being logical abstractions of storage volumes presented by data storage system 48, made to appear to the VMs 34 like actual disks by storage manager 40 of the VM management application 38.

Each VVol 36 is backed by a virtual logical unit (VLU) 54, 56 provided by the data storage system 48. VLUs 54, 56 are not exactly "virtual," except insofar as they are typically used by virtual machines 34.

Data storage system 48 may be configured to provide both block-based VLUs 54 (depicted as VLUs 54(a), 54(b), 54(c), 54(d), 54(e)) and file-based VLUs 56 (depicted as VLUs 56(a), 56(b), 56(c), 56(d)). Block-based VLUs 54 are presented to hosts 32 using block-based storage protocols, such as, for example, Fibre Channel and iSCSI. File-based VLUs 56 are presented to hosts 32 using file-based storage protocols, such as, for example, NFS, SMB 3.0, and CIFS, allowing the VMs 34 to send requests across network 42 making reference to particular files and directories of a filesystem maintained by the data storage system 48 on the respective file-based VLUs 56. In contrast, hosts 32 typically maintain the filesystems for block-based VLUs 54 on the hosts 32 themselves (e.g., within the individual VMs 34 or within storage manager 40).

Each VLU 54, 56 is presented to the hosts 32 through a protocol endpoint (PE) 50 on the data storage system 48. A PE 50 is a software construct that serves to present a VLU 54/56 to the hosts 32 as a VVol as is known in the art. Typically, each VLU 54, 56 is presented through only one PE 50, but a single PE 50 may present several VLUs 54, 56. A single PE 50 either presents block-based VLUs 54 or file-based VLUs 56, but not both. In some embodiments, each PE 50 is uniquely associated with a particular storage processor of the data storage system 48.

In some embodiments, storage containers 58 are used to organize the VLUs 54, 56 on the data storage system 48. In some arrangements, a different storage container 58 is used for each client purchasing usage of VMs 34 on hosts 32. Each storage container 58 is used for either block-based VLUs 54 or file-based VLUs 56, but not both. Each storage container 58 may be assigned to use slices from one or more storage pools 59. A specific amount of storage from each storage pool 59 may be assigned to each storage container.

As depicted, storage containers 58(A) and 58(C) include block-based VLUs 54, while storage container 58(B) includes file-based VLUs 56. As depicted, storage container 58(A) includes block-based VLUs 54(*a*), 54(*b*), and 54(*c*). As depicted, block-based VLUs 54(*a*) and 54(*b*) are presented via PE 50(A)(1), while block-based VLU 54(*c*) is presented via PE 50(A)(2). As depicted, storage container 58(C) includes block-based VLUs 54(*d*) and 54(*e*). As depicted, block-based VLUs 54(*d*) and 54(*e*) are presented via PE 50(C)(1).

As depicted, storage container 58(B) includes file-based VLUs 56(*a*), 56(*b*), 56(*c*), and 56(*d*). As depicted, file-based VLUs 56(*a*) and 56(*b*) are presented via PE 50(B)(1), while file-based VLU 56(*c*) is presented via PE 50(B)(2), and file-based VLU 56(*d*) is presented via PE 50(B)(3).

Associated with each PE 50 is a performance reporting module 51. The performance reporting module 51 for each PE 50 is responsible for reporting counts of performance-related information for each VLU 54, 56 associated with that PE 50. Thus, for example, performance reporting module 51(A)(1), which is associated with file-based PE 50(A)(1), reports performance-related information for file-based VLUs 54(*a*), 54(*b*). Similarly, performance reporting module 51(B)(1), which is associated with block-based PE 50(B)(1), reports performance-related information for block-based VLUs 56(*a*), 56(*b*).

In operation, VMs 34 send block-based storage commands 70 to the data storage system 48 to access block-based VLUs 54. These block-based storage commands 70 are directed at the particular PE 50 which presents that VLU 54. In response, the PE 50 executes the appropriate storage command (e.g., a READ command, a WRITE command, etc.) and sends back a corresponding block-based storage response 71 to the issuing VM 34.

In operation, VMs 34 also send file-based storage commands 72 to the data storage system 48 to access file-based VLUs 56. These file-based storage commands 71 are directed at the particular PE 50 which presents that VLU 56. In response, the PE 50 executes the appropriate storage command (e.g., a READ command, a WRITE command, etc.) and sends back a corresponding file-based storage response 73 to the issuing VM 34.

As each PE 50 processes the storage commands 70, 72 that are directed to it, the corresponding performance reporting module 51 for that PE 50 keeps track of performance-related information for each VLU 54, 56 associated with that PE 50. Thus, for example, each performance reporting module 51 keeps track of the total number of READ commands 70, 72 fulfilled (by issuance of READ responses 72, 74) for each VLU 54, 56 that it is responsible for, incrementing a counter (not depicted) each time. Similarly, each performance reporting module 51 keeps track of the total number of WRITE commands 70, 72 fulfilled (by issuance of WRITE responses 72, 74) for each VLU 54, 56 that it is responsible for, incrementing a counter (not depicted) each time.

As another example, block-based performance reporting module 51(A)(1) keeps track of the total number of read blocks (not depicted) sent in block-based READ responses 71 (in response to block-based READ requests 70) for each of block-based VLU 54(*a*) and 54(*b*). Similarly, block-based performance reporting module 51(A)(1) keeps track of the total number of written blocks (not depicted) received in block-based WRITE requests 70 (for which there is a successful completion as evidenced by a successful block-based WRITE response 71) for each of block-based VLU 54(*a*) and 54(*b*).

As another example, block-based performance reporting module 51(A)(1) keeps track of the total number of milliseconds of elapsed time (not depicted) between receipt of each block-based storage command 70 and its corresponding block-based storage response 71 (aggregating READ and WRITE commands together) for each of block-based VLU 54(*a*) and 54(*b*).

As another example, file-based performance reporting module 51(B)(1) keeps track of the total number of read bytes (not depicted; in some embodiments, it may equivalently record a number of kilobytes or megabytes) sent in file-based READ responses 73 (in response to file-based READ requests 72) for each of file-based VLU 56(*a*) and 56(*b*). Similarly, file-based performance reporting module 51(B)(1) keeps track of the total number of written bytes (not depicted) received in file-based WRITE requests 72 (for which there is a successful completion as evidenced by a successful file-based WRITE response 73) for each of file-based VLU 56(*a*) and 56(*b*).

As another example, file-based performance reporting module 51(B)(1) keeps track of the total number of milliseconds of elapsed READ time (not depicted) between receipt of each file-based READ command 72 and its corresponding file-based READ response 73 for each of file-based VLU 56(*a*) and 56(*b*). Similarly, file-based performance reporting module 51(B)(1) keeps track of the total number of milliseconds of elapsed WRITE time (not depicted) between receipt of each file-based WRITE command 72 and its corresponding file-based WRITE response 73 for each of file-based VLU 56(*a*) and 56(*b*).

A performance management application 44 runs on a computing device of environment 30. As depicted, performance management application 44 runs within a VM 34(*y*) running on host 32(*q*). Every so often, performance management application 44 sends a polling request 80 to each performance reporting module 51 on the data storage system 48. This may be done either at regular intervals (e.g., every 5 minutes) or at irregular intervals. In response, each performance reporting module 51 sends back count data 82 for the performance-related information that it has recorded since it was last polled.

In some embodiments, the count data 82 includes an address of each VLU 54, 56 for which it is reporting. Thus, for example, if block-based PE 50(A)(2) is based on storage processor 1 of data storage system 48, then, the address reported with the count data 82 for block-based VLU 54(*c*) might be SP1.storage.VVol.Block.54*c*. There may further be a metric name appended to the address for each metric being reported. Thus, for block-based VLU 54(*c*), the following metric names may be sent:
SP1.storage.VVol.Block.54*c*.readBlocks,
SP1.storage.VVol.Block.54*c*.writeBlocks,
SP1.storage.VVol.Block.54*c*.totalIOtime,
SP1.storage.VVol.Block.54*c*.reads, and
SP1.storage.VVol.Block.54*c*.writes. Similarly, if file-based PE 50(B)(3) is based on storage processor 2 of data storage system 48, then the address reported with the count data 82 for block-based VLU 56(*d*) might be SP2.storage.VVol.File.56*d*. In addition, for file-based VLU 56(*d*), the following metric names may be sent:
SP2.storage.VVol.File.56*d*.readBytes,
SP2.storage.VVol.File.56*d*.writeBytes,
SP2.storage.VVol.File.56*d*.readIOtime, SP2.storage.VVol.File.56*d*.writeIOtime,
SP2.storage.VVol.File.56*d*.reads, and
SP2.storage.VVol.File.56*d*.writes.

Thus, as can be seen, there are separate namespaces for block-based VLUs 54 and file-based VLUs 56. For example, on SP1, the file-based namespace is SP1.storage.VVol.File, while the block-based namespace is SP1.storage.VVol.Block. There are also different metric names for the VLUs 54, 56 in each namespace.

In some embodiments, the polling requests 80 and the count data 82 are each sent using a REST-based format.

A user 47, such as a system administrator, may access the performance management application 44 either by directly operating the host 32(*q*) on which it is running or by operating a remote client computing device that connects to the host 32(*q*), e.g., over network 42. The user 47 may request various types of charts of performance data for the various VLUs 54, 56 of the data storage system 48. In one embodiment, a display device 46-1 visible to the user 47 displays a chart 90-1 of performance data for both block-based VLUs 54 and file-based VLUs 56 displayed together at the same time (even though the metrics reported by the two types of VLU 54, 56 are different). In another embodiment, a display device 46-2 visible to the user 47 displays a chart 90-2 of aggregated performance data of all VLUS 54, 56 within a particular storage container 58.

Display device 46-1, 46-2 may be any kind of device capable of displaying images to user 47. Display device 46-1, 46-2 may be, for example, a CRT, LCD, plasma, or LED monitor or embedded display screen.

Figure 2:
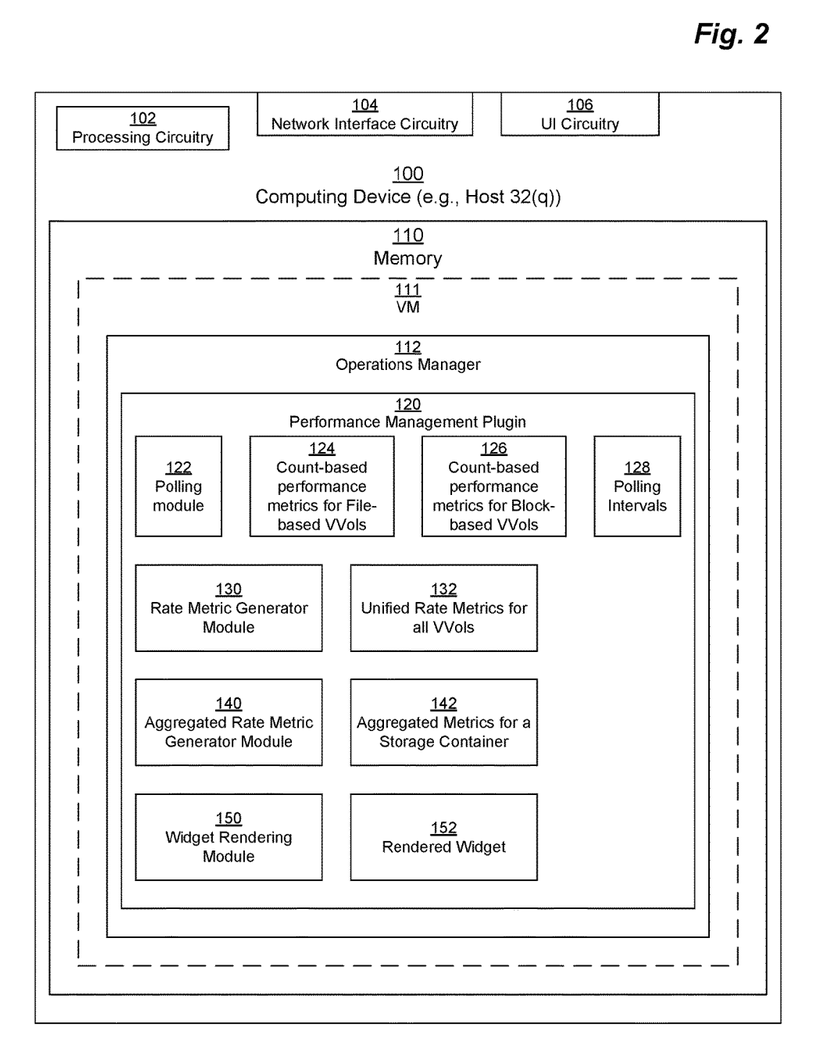
FIG. 2 is a block diagram depicting an example apparatus according to various embodiments.

FIG. 2 depicts an example computing device 100 on which performance management application 44 may run. In some embodiments, computing device 100 may be, for example, a host 32(*q*), while in other embodiments, it may be any kind of computing device.

Computing device 100 includes processing circuitry 102, network interface circuitry 104, and memory 110. In some embodiments, computing device 100 may also include user interface (UI) circuitry 106.

Processing circuitry 102 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 104 may include one or more Ethernet cards, cellular modems, Fibre Channel (FC) adapters, Wireless Fidelity (Wi-Fi) wireless networking adapters, and other devices for connecting to a network 35, such as a SAN, local area network (LAN), wide area network (WAN), cellular data network, etc. Network interface circuitry 104 is able to communicate with data storage system 48 over network 42.

UI circuitry 106 may connect to one or more UI devices (not depicted), which allow a user 47 to directly interact with the computing device 100. UI circuitry may include, for example, a graphics adapter for connecting to a display device (e.g., display screen 46) and one or more communications buses. These communications buses may connect to, for example, a keyboard, mouse, trackpad, etc.

The memory 110 may include both volatile memory (e.g., random access memory, RAM), and non-volatile memory, such as one or more read-only memories (ROMs), disk drives, solid-state drives, and the like. At a minimum, memory 110 includes system memory, typically RAM. The processing circuitry 102 and the memory 110 together form control circuitry, which is constructed and arranged to carry out various methods and functions as described herein, e.g., alone or in coordination with similar control circuitry on another data storage system. Also, the memory 110 includes a variety of software constructs realized in the form of executable instructions. When the executable instructions are run by the processing circuitry 102, the processing circuitry 102 is caused to carry out the operations of the software constructs. Although certain software constructs are specifically shown and described, it is understood that the memory 110 typically includes many other software constructs, which are not shown, such as an operating system, various applications, processes, and daemons. Applications configured to run on processing circuitry 102 when stored in non-transitory form, either in the volatile portion or the non-volatile portion of memory 110 or both, form a computer program product. The processing circuitry 102 running one or more of these applications thus forms a specialized circuit constructed and arranged to carry out the various processes described herein.

As shown in FIG. 2, the memory 110 includes an operations manager program 112. In some embodiments, operations manager 112 runs within a virtual machine 111. Operations manager 112 may execute to provide a user 47 with control over certain configuration parameters of data storage system 48 and VM 38. Operations manager 112 also includes a performance management plugin 120, which is configured to allow the user 47 to visualize performance information relating to the various VLUs 54, 56 on the data storage system 48. Operations manager 112, when running performance management plugin 120, realizes the performance management application 44 of FIG. 1 in some embodiments.

As depicted, performance management plugin 120 includes a polling module 122 configured to send polling requests 80 to the various performance reporters 51 running on the data storage system 48 in order to obtain the count data 82 regarding each VLU 54, 56. Polling module 122 is able to store the count-based performance metrics 124 for file-based VVols 56 and the count-based performance metrics 126 for block-based VVols within memory 120. In one example embodiment, the metrics within count-based performance metrics 126 for block-based VVols include, for each block-based VLU 54, readBlocks, writeBlocks, totalIOtime, reads, and writes. There is also a measure of block size stored. In the example embodiment, the metrics within count-based performance metrics 124 for file-based VVols include, for each file-based VLU 56, readBytes, writeBytes, readIOtime, writeIOtime, reads, and writes. Thus, it may be seen that at least some of the metrics in 124 and 126 measure different performance characteristics from each other. Polling module 122 may also store one or more polling intervals 128 associated with the count-based performance metrics 126, 128. In one embodiment, a single polling interval 128 (e.g., 5 minutes) is used for all VLUs 54, 56 and does not change from polling request 80 to polling request 80. In other embodiments, the polling interval 128 may change from polling request 80 to polling request 80. In other embodiments, the polling interval 128 may differ between the polling requests 80 for block-based VLUs 54 and file-based VLUs 56.

Rate metric generator module 130 operates on the count-based performance metrics 124 for file-based VVols and the count-based performance metrics 126 for block-based VVols to generate unified rate metrics 132 for all VVols. Thus, even though the metrics in 124 and 126 measure different performance characteristics from each other, the metrics of unified rate metrics 132 are the same for all VLUs 54, 56.

Thus, for example, rate metric generator module 130 uses the appropriate polling interval 128 and the associated count-based performance metrics 126 for block-based VVols as well as the block size for each block-based VLU 54 to generate some of the unified rate metrics 132, and it also uses appropriate polling interval 128 and the associated count-based performance metrics 124 for file-based VVols to generate the rest of the unified rate metrics 132. In one embodiment, for example, the unified rate metrics 132 include read speed (in megabytes per second), write speed (in megabytes per second), read operations performance metric (in I/O transactions per second), write operations performance metric (in I/O transactions per second), total speed (in megabytes per second), total operations performance metric (in I/O transactions per second), and average latency (in milliseconds per I/O transaction).

Aggregated rate metric generator module 140 operates on storage containers 58 to generate the same metrics as found in the unified rate metrics 132 but aggregated over all VLUs 54, 56 within each storage container 58 as aggregated metrics 142 for a storage container 58. Thus, in one example embodiment, aggregated rate metric generator module 140 operates on the count-based performance metrics 126 for block-based VLUs 54(a), 54(b), 54(c), adding the corresponding metrics together and then calculating the read speed (in megabytes per second), write speed (in megabytes per second), read operations performance metric (in I/O transactions per second), write operations performance metric (in I/O transactions per second), total speed (in megabytes per second), total operations performance metric (in I/O transactions per second), and average latency (in milliseconds per I/O transaction) over the entire storage container 58(a), storing the results as aggregated metrics 142 for storage container 58(a). Similarly, in the example, aggregated rate metric generator module 140 operates on the count-based performance metrics 124 for file-based VLUs 56(a), 56(b), 56(c), 56(d) adding the corresponding metrics together and then calculating the read speed (in megabytes per second), write speed (in megabytes per second), read operations performance metric (in I/O transactions per second), write operations performance metric (in I/O transactions per second), total speed (in megabytes per second), total operations performance metric (in I/O transactions per second), and average latency (in milliseconds per I/O transaction) over the entire storage container 58(b), storing the results as aggregated metrics 142 for storage container 58(b).

Widget rendering module 150, based on input from user 47, renders a widget 152 graphically depicting performance of several VLUs 54, 56 or one or more storage containers 58 as based on the stored unified rate metrics 132 or aggregated metrics 142. In some embodiments, this may be a simple graph or it may be a heatmap. This rendered widget 152 may then be displayed on display device 46 as chart 90-1 or chart 90-2.

Operation of Embodiments for Converging File- and Block-Based Metrics

Figure 3A:
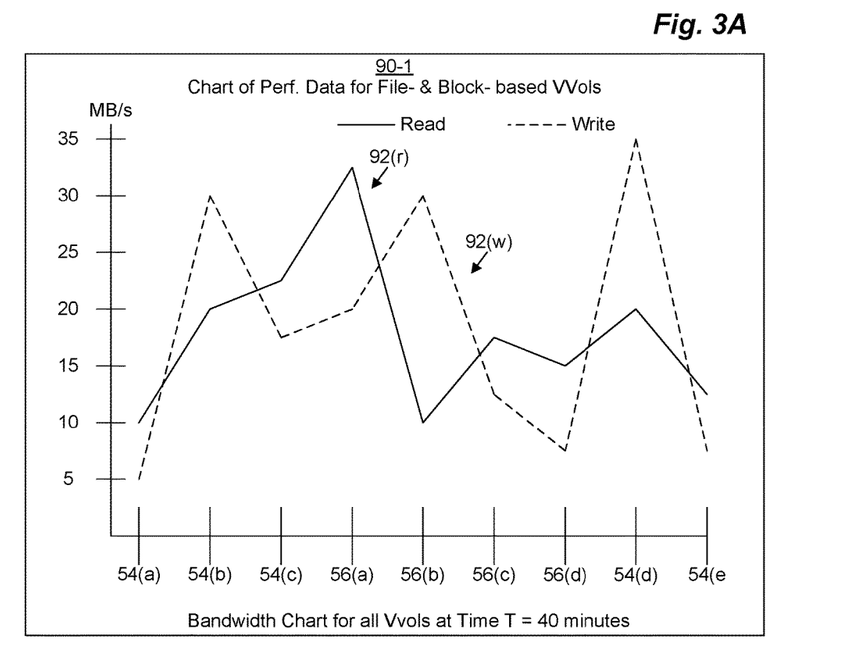
FIGS. 3A and 3B are block diagrams depicting example performance visualizations produced according to techniques of various embodiments.

FIG. 3A depicts an example chart 90-1 for file- and block-based VVols. As depicted, the chart 90-1 depicts a read performance indicator 92(r) in megabytes per second (MB/s) for each VLU 54, 56 on data storage system 48 at time T=40 minutes (e.g., over the 5-minute interval from 40 minutes to 45 minutes). Chart 90-1 also depicts a write performance indicator 92(w) in MB/s for each VLU 54, 56 on data storage system 48 at time T=40 minutes (e.g., over the 5-minute interval from 40 minutes to 45 minutes).

Figure 3B:
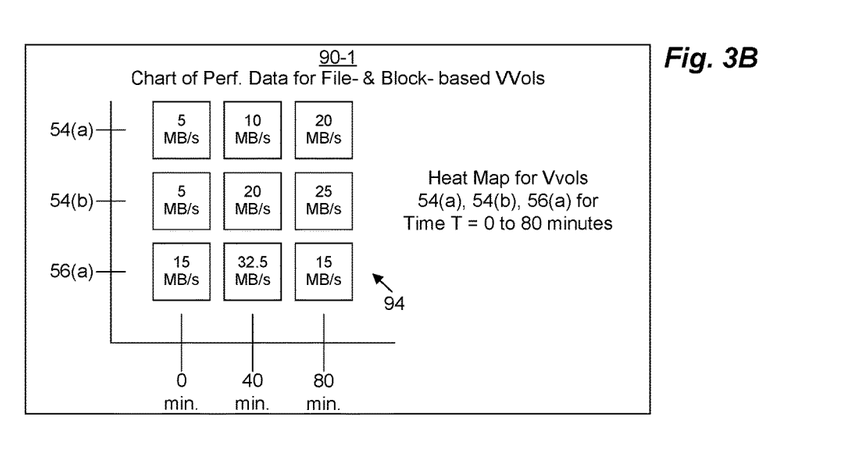

FIG. 3B depicts another example chart 90-1 for file- and block-based VVols. As depicted, this chart 90-1 is a heatmap indicating read performance in megabytes per second (MB/s) for each of VLU 54(a), 54(b), and 56(a) on data storage system 48 at times T=0 minutes (e.g., over the 5-minute interval from 0 minutes to 5 minutes), 40 minutes (e.g., over the 5-minute interval from 40 minutes to 45 minutes), and 80 minutes (e.g., over the 5-minute interval from 80 minutes to 85 minutes). Thus, the heatmap includes a measurement 94 for each of VLU 54(a), 54(b), 56(a) paired with a time of 0, 40, or 80 minutes. As depicted, each measurement 94 is shown as a numerical value. However, in another embodiment, each measurement 94 may be shown using a different color based on the numerical value.

Figure 4:
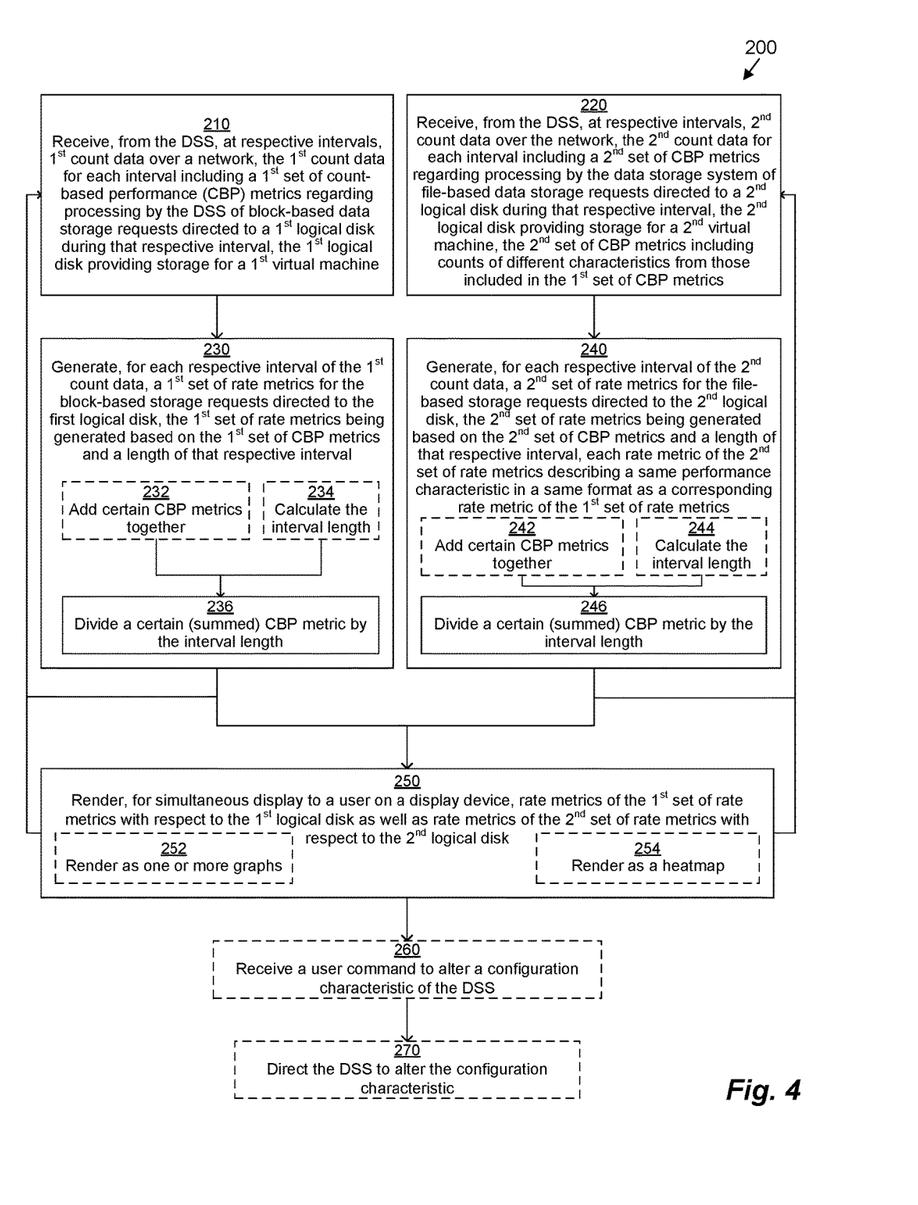
FIG. 4 is a flowchart depicting example methods according to various embodiments.

FIG. 4 depicts an example method 200 for administering storage for VMs 34 on a data storage system 48. Method 200 relates to displaying a chart 90-1 to a user 47 on display device 46, the chart 90-1 including depictions of unified rate metrics 132 for both block-based VLUs 54 and file-based VLUs 56 together. Method 200 is performed by performance management application 44 or operations manager 112 (although primarily by performance management plugin 120).

It should be understood that any time a piece of software (e.g., performance management application 44, operations manager 112, performance management plugin 120, VM manager 38, storage manager 40, VM 34, 111, polling module 122, rate metric generator module 130, aggregated rate metric generator module 140, widget rendering module 150, etc.) is described as performing a method, process, step, or function, in actuality what is meant is that a computing device (e.g., computing device 100, host 32, data storage system 48, etc.) on which that piece of software is running performs the method, process, step, or function when executing that piece of software on its processing circuitry 102. It should be understood that, in some embodiments, one or more of the steps or sub-steps may be omitted. Similarly, in some embodiments, one or more steps or sub-steps may be combined together or performed in a different order.

Method 200 may be performed as the data storage system 48 continues to operate to perform I/O transactions, receiving storage commands 70, 72 and responding with storage responses 71, 73.

Steps 210 and 230 are performed in parallel with steps 220 and 240.

In step 210, performance management plugin 120 receives via network interface circuitry 104, from the data storage system 48, count data 82 from the various performance reporters 51 representing block-based VLUs 54. This count data 82 is received at respective intervals for each performance reporter 51. The count data 82 is typically received by the performance management plugin 120 in response to the performance management plugin 120 sending a polling request 80 to the respective performance reporter 51 at intervals (e.g., every 5 minutes, at shorter or longer periodic intervals, or at non-periodic intervals). The received count data 82 includes a set of count-based performance metrics (as recorded by the associated performance reporter 51) for each block-based VLU 54 for each polled interval. Step 210 is typically performed by polling module 122, which saves the received count data 82 for the block-based VLUs 54 as count-based performance metrics 126 for block-based VVols.

In parallel, in step 220, performance management plugin 120 receives via network interface circuitry 104, from the data storage system 48, count data 82 from the various performance reporters 51 representing file-based VLUs 56.

This count data 82 is received at respective intervals for each performance reporter 51. The count data 82 is typically received by the performance management plugin 120 in response to the performance management plugin 120 sending a polling request 80 to the respective performance reporter 51 at intervals (e.g., every 5 minutes, at shorter or longer periodic intervals, or at non-periodic intervals). The received count data 82 includes a set of count-based performance metrics (as recorded by the associated performance reporter 51) for each file-based VLU 56 for each polled interval. Step 220 is typically performed by polling module 122, which saves the received count data 82 for the file-based VLUs 56 as count-based performance metrics 124 for file-based VVols. The count-based performance metrics 124 for file-based VVols include measurements of at least some performance characteristics that differ from those stored in count-based performance metrics 126 for block-based VVols.

In step 230, performance management plugin 120 generates, for each respective interval of the count-based performance metrics 126 for block-based VVols, unified rate metrics 132 for the block-based VLUs 54. Step 230 is typically performed by rate metric generator module 130.

In some embodiments, rate metric generator module 130 generates the unified rate metrics 132 for the block-based VLUs 54 at various intervals by first (sub-step 232) optionally adding together certain metrics of the count-based performance metrics 126 and (sub-step 234) optionally calculating the length of the respective polling interval 128 for the respective interval, and then (sub-step 236) dividing various metrics of the count-based performance metrics 126 and/or sums thereof by the length of the polling interval 128. In some embodiments, the length of the polling interval 128 need not be calculated if it may be assumed to be constant.

For example, in some embodiments, for a particular interval and a particular block-based VLU 54($x$), rate metric generator module 130 generates the read speed (in megabytes per second) by multiplying the readBlocks value of the count-based performance metrics 126 by a block size for that VLU 54($x$) and dividing by the length of the polling interval 128. Similarly, metric generator module 130 generates the write speed (in megabytes per second) by multiplying the writeBlocks value of the count-based performance metrics 126 by the block size for that VLU 54($x$) and dividing by the length of the polling interval 128. Similarly, metric generator module 130 generates the total speed (in megabytes per second) by first summing together the readBlocks and writeBlocks values of the count-based performance metrics 126, then multiplying by the block size for that VLU 54($x$) and dividing by the length of the polling interval 128.

In addition, metric generator module 130 generates the read operations performance metric (in I/O transactions per second) by dividing the reads value of the count-based performance metrics 126 by the length of the polling interval 128. Similarly, metric generator module 130 generates the write operations performance metric (in I/O transactions per second) by dividing the writes value of the count-based performance metrics 126 by the length of the polling interval 128. Similarly, metric generator module 130 generates the total operations performance metric (in I/O transactions per second) by first summing together the reads and writes values of the count-based performance metrics 126, and then dividing by the length of the polling interval 128.

Finally, metric generator module 130 generates the average latency (in milliseconds per I/O transaction) by dividing the totalIOtime value of the count-based performance metrics 126 by the length of the polling interval 128.

In step 240, performance management plugin 120 generates, for each respective interval of the count-based performance metrics 124 for file-based VVols, unified rate metrics 132 for the file-based VLUs 56. Step 240 is typically performed by rate metric generator module 130 in parallel with step 230.

In some embodiments, rate metric generator module 130 generates the unified rate metrics 132 for the file-based VLUs 56 at various intervals by first (sub-step 242) optionally adding together certain metrics of the count-based performance metrics 124 and (sub-step 244) optionally calculating the length of the respective polling interval 128 for the respective interval, and then (sub-step 246) dividing various metrics of the count-based performance metrics 124 and/or sums thereof by the length of the polling interval 128. In some embodiments, the length of the polling interval 128 need not be calculated if it may be assumed to be constant.

For example, in some embodiments, for a particular interval and a particular file-based VLU 56($x$), rate metric generator module 130 generates the read speed (in megabytes per second) by dividing the readBytes value of the count-based performance metrics 124 by the length of the polling interval 128 and scaling the result into the megabyte scale (e.g., dividing by $10^{20}$ as is well-known in the art). Similarly, metric generator module 130 generates the write speed (in megabytes per second) by dividing the writeBytes value of the count-based performance metrics 124 by the length of the polling interval 128 and scaling the result into the megabyte scale. Similarly, metric generator module 130 generates the total speed (in megabytes per second) by first summing together the readBytes and writeBytes values of the count-based performance metrics 124, then dividing by the length of the polling interval 128 and scaling the result into the megabyte scale.

In addition, metric generator module 130 generates the read operations performance metric (in I/O transactions per second) by dividing the reads value of the count-based performance metrics 124 by the length of the polling interval 128. Similarly, metric generator module 130 generates the write operations performance metric (in I/O transactions per second) by dividing the writes value of the count-based performance metrics 124 by the length of the polling interval 128. Similarly, metric generator module 130 generates the total operations performance metric (in I/O transactions per second) by first summing together the reads and writes values of the count-based performance metrics 124, and then dividing by the length of the polling interval 128.

Finally, metric generator module 130 generates the average latency (in milliseconds per I/O transaction) by first summing together the readIOtime and writeIOtime values of the count-based performance metrics 124, and then dividing by the length of the polling interval 128.

After completion of steps 230 and 240, operation may return back to steps 210 and 220 after the appropriate interval. Alternatively, if the user 47 has requested display of a chart 90-1, operation may instead proceed with step 250.

In step 250, performance management plugin 120 renders, for simultaneous display to a user 47 on a display device 46, unified rate metrics 132 for both block-based VLUs 54 and file-based VLUs 56. In some example embodiments, this may be accomplished by widget rendering module 150 rendering a rendered widget 152 for display as chart 90-1 similar to the graph of FIG. 3A, and in other example embodiments, this may be accomplished by widget rendering module 150 rendering a rendered widget 152 for display as chart 90-1 similar to the heatmap of FIG. 3B.

After completion of step 250, operation may return back to steps 210 and 220 after the appropriate interval. Alternatively, if the user 47 has decided, after viewing chart 90-1 that a change is needed, operation may instead proceed with optional step 260.

In step 260, operations manager 112 receives a command from the user 47 to alter a configuration characteristic of the data storage system 48. For example, the user 47 may decide, upon noting that the performance of a particular VLU 54(*x*), 56(*x*) is lower than expected, that that VLU 54(*x*), 56(*x*) should be migrated to a different storage pool 59 having higher performance.

In response, in step 270, operations manager 112 directs the data storage system 48 to make the requested configuration change.

Operation of Embodiments for Aggregating Metrics Over a Storage Container

Figure 5:
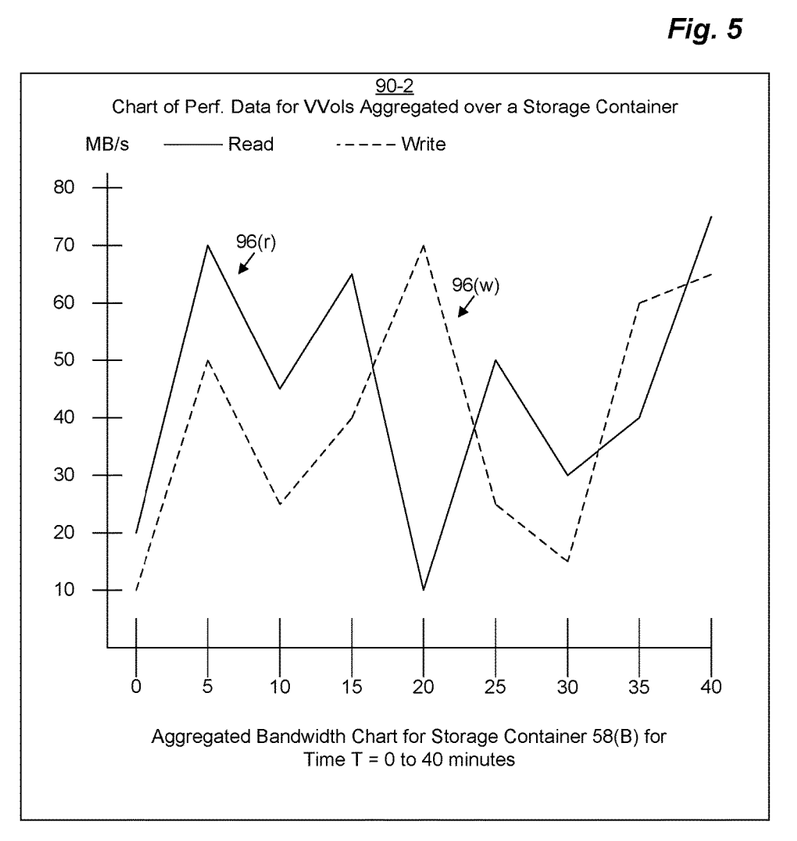
FIG. 5 is a block diagram depicting an example performance visualization produced according to techniques of various embodiments.

FIG. 5 depicts an example chart 90-2 for aggregated performance of VVols over a storage container 58. As depicted, the chart 90-2 depicts a read performance indicator 96(*r*) in MB/s for an entire storage container 58(B) at times from 0 (representing an interval from time T=0 through time T=5 minutes) through 40 minutes (representing an interval from time T=40 through time T=45 minutes). At each time T, the read performance indicator 96(*r*) represents an aggregation of the read performance of all VLUs 56(*a*), 56(*b*), 56(*c*), 56(*d*) in storage container 58(B) at that time T.

Chart 90-2 also depicts a write performance indicator 96(*w*) in MB/s for the entire storage container 58(B) at times from 0 (representing an interval from time T=0 through time T=5 minutes) through 40 minutes (representing an interval from time T=40 through time T=45 minutes). At each time T, the write performance indicator 96(*w*) represents an aggregation of the write performance of all VLUs 56(*a*), 56(*b*), 56(*c*), 56(*d*) in storage container 58(B) at that time T.

Although the performance of a file-based storage container 58(B) is depicted, that is by way of example only. In another example, chart 90-2 may instead depict aggregated performance of a block-based storage container 58 (e.g., storage container 58(A), 58(C)).

Figure 6:
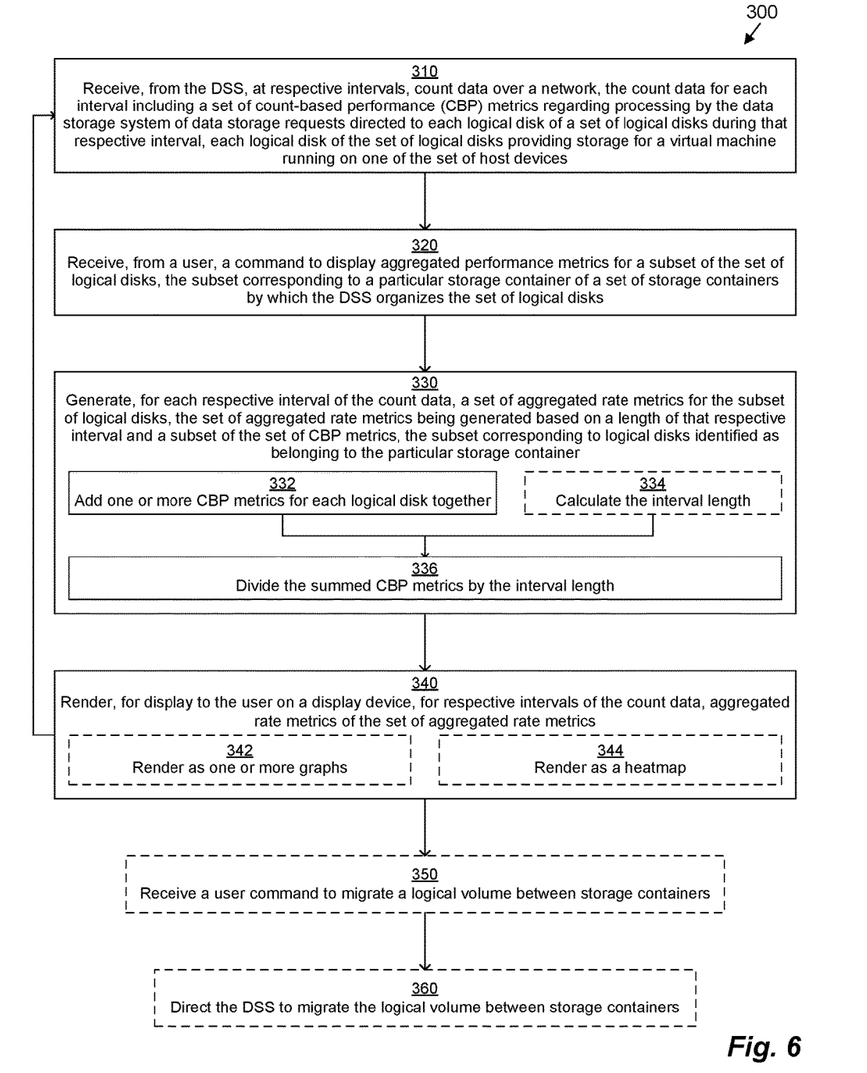
FIG. 6 is a flowchart depicting example methods according to various embodiments.

FIG. 6 depicts an example method 300 for administering storage for VMs 34 on a data storage system 48. Method 300 relates to displaying a chart 90-2 to a user 47 on display device 46, the chart 90-2 including depictions of aggregated metrics 142 for an entire storage container 58. Method 300 is performed by performance management application 44 or operations manager 112 (although primarily by performance management plugin 120).

Method 300 may be performed as the data storage system 48 continues to operate to perform I/O transactions, receiving storage commands 70, 72 and responding with storage responses 71, 73.

In step 310, performance management plugin 120 receives via network interface circuitry 104, from the data storage system 48, count data 82 from the various performance reporters 51 representing VLUs 54, 56. This count data 82 is received at respective intervals for each performance reporter 51. The count data 82 is typically received by the performance management plugin 120 in response to the performance management plugin 120 sending a polling request 80 to the respective performance reporter 51 at intervals (e.g., every 5 minutes, at shorter or longer periodic intervals, or at non-periodic intervals). The received count data 82 includes a set of count-based performance metrics (as recorded by the associated performance reporter 51) for each VLU 54, 56 for each polled interval. Step 310 is typically performed by polling module 122, which saves the received count data 82 for the VLUs 54, 56 as count-based performance metrics 124, 126.

In step 320, performance management plugin 120 receives, from a user 47, a user command to display aggregated performance metrics 142 for a subset of the set of logical disks 54, 56, the subset corresponding to a particular storage container 58(*x*) of a set of storage containers 58 by which the data storage system 48 organizes the set of logical disks 54, 56. In some embodiments, the user command may direct the performance management plugin 120 to display aggregated performance metrics 142 for several different selected storage container 58($x_1$), 58($x_2$), etc.

In step 330, performance management plugin 120 generates, for each respective interval of the count-based performance metrics 124, 126, aggregated metrics 142 for the selected storage container 58(*x*). Step 330 is typically performed by aggregated metric generator module 140.

In some embodiments, aggregated metric generator module 140 generates the aggregated metrics 142 for the selected storage container 58(*x*) at various intervals by first (sub-step 332) adding together one or more metrics of the count-based performance metrics 124, 126 for all VLUs 54, 56 of the selected storage container 58(*x*) and (sub-step 334) optionally calculating the length of the respective polling interval 128 for the respective interval, and then (sub-step 336) dividing the various summed metrics from sub-step 332 by the length of the polling interval 128. In some embodiments, the length of the polling interval 128 need not be calculated if it may be assumed to be constant.

For example, in some embodiments, for a particular interval and a particular block-based storage container 58(*x*) (e.g., 58(A)), aggregated rate metric generator module 140 generates the aggregated read speed (in megabytes per second) by first multiplying the readBlocks value of the count-based performance metrics 126 of each VLU 54(*a*), 54(*b*), 54(*c*) of the selected storage container 58(A) by a block size for that respective VLU 54(*a*), 54(*b*), 54(*c*), summing those three products together, and dividing the sum by the length of the polling interval 128 (assuming that the polling interval 128 is the same for each VLU 54(*a*), 54(*b*), 54(*c*) of the selected storage container 58(A)—if not, a correction can be applied as is well-known in the art). Similarly, aggregated rate metric generator module 140 generates the aggregated write speed (in megabytes per second) by first multiplying the writeBlocks value of the count-based performance metrics 126 of each VLU 54(*a*), 54(*b*), 54(*c*) of the selected storage container 58(A) by a block size for that respective VLU 54(*a*), 54(*b*), 54(*c*), summing those three products together, and dividing the sum by the length of the polling interval 128 (again assuming that the polling interval 128 is the same for each VLU 54). Similarly, aggregated rate metric generator module 140 generates the aggregated total speed (in megabytes per second) by first multiplying the sum of the writeBlocks value and the readBlocks value of the count-based performance metrics 126 of each VLU 54(*a*), 54(*b*), 54(*c*) of the selected storage container 58(A) by a block size for that respective VLU 54(*a*), 54(*b*), 54(*c*), summing those three products together, and dividing the sum by the length of the polling interval 128 (again assuming that the polling interval 128 is the same for each VLU 54).

In addition, aggregated rate metric generator module 140 generates the aggregated read operations performance metric (in I/O transactions per second) by first summing together the reads value of the count-based performance metrics 126 of each VLU 54(a), 54(b), 54(c) of the selected storage container 58(A) and then dividing the sum by the length of the polling interval 128. Similarly, aggregated rate metric generator module 140 generates the aggregated write operations performance metric (in I/O transactions per second) by first summing together the writes value of the count-based performance metrics 126 of each VLU 54(a), 54(b), 54(c) of the selected storage container 58(A) and then dividing the sum by the length of the polling interval 128. Similarly, aggregated rate metric generator module 140 generates the aggregated total operations performance metric (in I/O transactions per second) by first summing together both the reads and writes values of the count-based performance metrics 126 of each VLU 54(a), 54(b), 54(c) of the selected storage container 58(A) and then dividing the sum by the length of the polling interval 128.

Finally, aggregated rate metric generator module 140 generates the aggregated average latency (in milliseconds per I/O transaction) by first summing together the totalIOtime value of the count-based performance metrics 126 of each VLU 54(a), 54(b), 54(c) of the selected storage container 58(A) and then dividing the sum by the length of the polling interval 128.

As another example, for a particular interval and another particular file-based storage container 58(x) (e.g., 58(B)), aggregated rate metric generator module 140 generates the aggregated read speed (in megabytes per second) by first summing together the readBytes value of the count-based performance metrics 124 of each VLU 56(a), 56(b), 56(c), 56(d) of the selected storage container 58(B) and dividing the sum by the length of the polling interval 128 (assuming that the polling interval 128 is the same for each VLU 56(a), 56(b), 56(c), 56(d) of the selected storage container 58(B)—if not, a correction can be applied as is well-known in the art) and scaling the result into the megabyte scale (e.g., dividing by $10^{20}$ as is well-known in the art). Similarly, aggregated rate metric generator module 140 generates the aggregated write speed (in megabytes per second) by first summing together the writeBytes value of the count-based performance metrics 124 of each VLU 56(a), 56(b), 56(c), 56(d) of the selected storage container 58(B) and dividing the sum by the length of the polling interval 128 (again assuming that the polling interval 128 is the same for each VLU 56) and scaling the result into the megabyte scale. Similarly, aggregated rate metric generator module 140 generates the aggregated total speed (in megabytes per second) by first summing together both the readBytes and writeBytes values of the count-based performance metrics 124 of each VLU 56(a), 56(b), 56(c), 56(d) of the selected storage container 58(B) and dividing the sum by the length of the polling interval 128 (again assuming that the polling interval 128 is the same for each VLU 56) and scaling the result into the megabyte scale.

In addition, aggregated rate metric generator module 140 generates the aggregated read operations performance metric (in I/O transactions per second) by first summing together the reads value of the count-based performance metrics 124 of each VLU 56(a), 56(b), 56(c), 56(d) of the selected storage container 58(B) and then dividing the sum by the length of the polling interval 128. Similarly, aggregated rate metric generator module 140 generates the aggregated write operations performance metric (in I/O transactions per second) by first summing together the writes value of the count-based performance metrics 124 of each VLU 56(a), 56(b), 56(c), 56(d) of the selected storage container 58(B) and then dividing the sum by the length of the polling interval 128. Similarly, aggregated rate metric generator module 140 generates the aggregated total operations performance metric (in I/O transactions per second) by first summing together both the reads and writes values of the count-based performance metrics 124 of each VLU 56(a), 56(b), 56(c), 56(d) of the selected storage container 58(B) and then dividing the sum by the length of the polling interval 128.

Finally, aggregated rate metric generator module 140 generates the aggregated average latency (in milliseconds per I/O transaction) by first summing together both the readIOtime and writeIOtime values of the count-based performance metrics 124 of each VLU 56(a), 56(b), 56(c), 56(d) of the selected storage container 58(B) and then dividing the sum by the length of the polling interval 128.

In step 340, performance management plugin 120 renders, for display to a user 47 on a display device 46, aggregated metrics 142 for the selected storage container 58(x).

In some example embodiments, this may be accomplished by widget rendering module 150 rendering a rendered widget 152 for display as chart 90-2 similar to the graph of FIG. 5. In other embodiments (not depicted), this may be accomplished by widget rendering module 150 rendering a heatmap of the aggregated metrics 142 for several different selected storage containers $58(x_1)$, $58(x_2)$, etc. as rendered widget 152 for display as chart 90-2.

After completion of step 340, operation may return back to steps step 310 after the appropriate interval. Alternatively, if the user 47 has decided, after viewing chart 90-2 that a change is needed, operation may instead proceed with optional step 350.

In step 350, operations manager 112 receives a command from the user 47 to migrate a VLU 54, 56 from one storage container 58 to another. For example, the user 47 may decide, upon noting that the performance of a particular storage container $58(x_1)$ is much lower than the performance of another storage container $58(x_2)$, to move one or more VLUs 54, 56 from storage container $58(x_1)$ to storage container $58(x_2)$.

In response, in step 360, operations manager 112 directs the data storage system 48 to migrate the selected VLUs 54, 56 from the one storage container 58 to the other.

Conclusion

Thus, improved techniques for visualizing performance of VVols 36 in data storage system 48 operating in a virtualization environment allow performance to be visualized in a highly-flexible manner. Thus, in one embodiment, the performances of block-based and file-based VVols 36 (backed by block-based VLUs 54 and file-based VLUs 56, respectively) are both converted into a mutually-compatible format 132 (steps 230 and 240) and rendered for display together on screen 46 (step 250). In another embodiment, the performances of all VVols 36 backed by VLUs 54, 56 within a storage container 58 are aggregated together for easy comparison among different storage containers 58. Advantageously, these techniques improve the experience of a user 47, allowing the user 47 to more easily determine whether aspects of the data storage system 48 should be reconfigured.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method, performed by a computing device, of administering storage for virtual machines running on a set of host devices, the storage being provided by a data storage system, the method comprising, while the data storage system is operating to process storage requests from the virtual machines running on the set of host devices:
   receiving, from the data storage system, at respective intervals, first count data over a network, the first count data for each interval including a first set of count-based performance metrics regarding processing by the data storage system of block-based data storage requests directed to a first logical disk during that respective interval, the first logical disk providing storage for a first virtual machine;
   receiving, from the data storage system, at respective intervals, second count data over the network, the second count data for each interval including a second set of count-based performance metrics regarding processing by the data storage system of file-based data storage requests directed to a second logical disk during that respective interval, the second logical disk providing storage for a second virtual machine, the second set of count-based performance metrics including counts of different characteristics from those included in the first set of count-based performance metrics;
   generating, for each respective interval of the first count data, a first set of rate metrics for the block-based storage requests directed to the first logical disk, the first set of rate metrics being generated based on the first set of count-based performance metrics and a length of that respective interval;
   generating, for each respective interval of the second count data, a second set of rate metrics for the file-based storage requests directed to the second logical disk, the second set of rate metrics being generated based on the second set of count-based performance metrics and a length of that respective interval, each rate metric of the second set of rate metrics describing a same performance characteristic in a same format as a corresponding rate metric of the first set of rate metrics; and
   rendering, for simultaneous display to a user on a display device, rate metrics of the first set of rate metrics with respect to the first logical disk as well as rate metrics of the second set of rate metrics with respect to the second logical disk.

2. The method of claim 1 wherein:
   generating the first set of rate metrics for each respective interval of the first count data includes dividing a sum of one or more count-based performance metrics of the first set of count-based performance metrics for that respective interval by the length of that respective interval; and
   generating the second set of rate metrics for each respective interval of the second count data includes dividing a sum of one or more count-based performance metrics of the second set of count-based performance metrics for that respective interval by the length of that respective interval.

3. The method of claim 2 wherein:
   generating the first set of rate metrics for each respective interval of the first count data includes
      summing a count of read operations completed with respect to the first logical disk during that respective interval and a count of write operations completed with respect to the first logical disk during that respective interval, yielding a first sum, and
      dividing the first sum by the length of that respective interval, to yield a total operations performance metric for each respective interval of the first count data, these yielded total operations performance metrics comprising the first set of rate metrics; and
   generating the second set of rate metrics for each respective interval of the second count data includes
      summing a count of read operations completed with respect to the second logical disk during that respective interval and a count of write operations completed with respect to the second logical disk during that respective interval, yielding a second sum, and
      dividing the second sum by the length of that respective interval, to yield a total operations performance metric for each respective interval of the second count data, these yielded total operations performance metrics comprising the second set of rate metrics.

4. The method of claim 2 wherein:
   generating the first set of rate metrics for each respective interval of the first count data includes dividing a count of accumulated latency for all storage operations completed with respect to the first logical disk by the length of that respective interval to yield an average latency metric for each respective interval of the first count data, these yielded average latency metrics comprising the first set of rate metrics; and
   generating the second set of rate metrics for each respective interval of the second count data includes,
      summing a count of accumulated latency for all read operations completed with respect to the second logical disk and a count of accumulated latency for all write operations completed with respect to the second logical disk, yielding a second sum, and
      dividing the second sum by the length of that respective interval to yield an average latency metric for each respective interval of the second count data, these yielded average latency metrics comprising the second set of rate metrics.

5. The method of claim 1 wherein:
   generating the first set of rate metrics for each respective interval of the first count data includes dividing a count, read from the first count data, of blocks read from the first logical disk during that respective interval by the length of that respective interval and multiplying by a block size to yield a read speed metric for each respective interval of the first count data, these yielded read speed metrics comprising the first set of rate metrics; and
   generating the second set of rate metrics for each respective interval of the second count data includes dividing a count, read from the second count data, of bytes read from the second logical disk during that respective interval by the length of that respective interval to yield a read speed metric for each respective interval of the second count data, these yielded read speed metrics comprising the second set of rate metrics.

6. The method of claim 5 wherein:
generating the first set of rate metrics for each respective interval of the first count data further includes dividing a count of read operations completed with respect to the first logical disk during that respective interval by the length of that respective interval to yield a read operations performance metric for each respective interval of the first count data, these yielded read operations performance metrics further comprising the first set of rate metrics; and
generating the second set of rate metrics for each respective interval of the second count data further includes dividing a count of read operations completed with respect to the second logical disk during that respective interval by the length of that respective interval to a yield read operations performance metric for each respective interval of the second count data, these yielded read operations performance metrics further comprising the second set of rate metrics.

7. The method of claim 1 wherein:
generating the first set of rate metrics for each respective interval of the first count data includes dividing a count, read from the first count data, of blocks written to the first logical disk during that respective interval by the length of that respective interval and multiplying by a block size to yield a write speed metric for each respective interval of the first count data, these yielded write speed metrics comprising the first set of rate metrics; and
generating the second set of rate metrics for each respective interval of the second count data includes dividing a count, read from the second count data, of bytes written to the second logical disk during that respective interval by the length of that respective interval to yield a write speed metric for each respective interval of the second count data, these yielded write speed metrics comprising the second set of rate metrics.

8. The method of claim 7 wherein:
generating the first set of rate metrics for each respective interval of the first count data further includes dividing a count of write operations completed with respect to the first logical disk during that respective interval by the length of that respective interval to yield a write operations performance metric for each respective interval of the first count data, these yielded write operations performance metrics further comprising the first set of rate metrics; and
generating the second set of rate metrics for each respective interval of the second count data further includes dividing a count of write operations completed with respect to the second logical disk during that respective interval by the length of that respective interval to a yield write operations performance metric for each respective interval of the second count data, these yielded write operations performance metrics further comprising the second set of rate metrics.

9. The method of claim 1 wherein:
generating the first set of rate metrics for each respective interval of the first count data includes
summing a count of blocks read from the first logical disk during that respective interval and a count of blocks written to the first logical disk during that respective interval, yielding a first sum,
dividing the first sum by the length of that respective interval, yielding a quotient, and
multiplying the quotient by a block size to yield a total speed metric for each respective interval of the first count data, these yielded total speed metrics comprising the first set of rate metrics; and
generating the second set of rate metrics for each respective interval of the second count data includes
summing a count of bytes read from the second logical disk during that respective interval and a count of bytes written to the second logical disk during that respective interval, yielding a second sum, and
dividing the second sum by the length of that respective interval to yield a total speed metric for each respective interval of the second count data, these yielded total speed metrics comprising the second set of rate metrics.

10. The method of claim 1 wherein:
receiving, at respective intervals, first count data from the data storage system includes (a) polling the data storage system for the first count data at a first set of times and (b) in response to polling data storage system for the first count data at each of the first set of times, receiving the first count data from the data storage system at each of a second set of times;
receiving, at respective intervals, second count data from the data storage system includes (a) polling the data storage system for the second count data at a third set of times and (b) in response to polling data storage system for the second count data at each of the third set of times, receiving the second count data from the data storage system at each of a fourth set of times;
generating the first set of rate metrics for each respective interval of the first count data includes subtracting (i) a first time value of the second set of times at which first count data for an immediately previous interval was received from (ii) a second time value of the second set of times at which first count data for the respective interval was received to yield (iii) the length of that respective interval; and
generating the second set of rate metrics for each respective interval of the second count data includes subtracting (i) a third time value of the fourth set of times at which second count data for an immediately previous interval was received from (ii) a fourth time value of the fourth set of times at which second count data for the respective interval was received to yield (iii) the length of that respective interval.

11. The method of claim 10 wherein:
polling the data storage system for the first count data at the first set of times includes sending a first polling command to the data storage system, the first polling command noting a first identifier of the first logical disk, the first identifier being within a namespace uniquely associated with block-based logical disks; and
polling the data storage system for the second count data at the third set of times includes sending a second polling command to the data storage system, the second polling command noting a second identifier of the second logical disk, the second identifier being within a namespace uniquely associated with file-based logical disks.

12. The method of claim 1 wherein rendering, for simultaneous display to a user on a display device, rate metrics of the first set of rate metrics with respect to the first logical disk as well as rate metrics of the second set of rate metrics with respect to the second logical disk, includes rendering a heat map depicting (a) rate metrics of the first set of rate metrics with respect to the first logical disk for each of a first set of time intervals and (b) corresponding rate metrics of the second set of rate metrics with respect to the second logical disk for each of the first set of time intervals.

13. The method of claim 1 wherein rendering, for simultaneous display to a user on a display device, rate metrics of the first set of rate metrics with respect to the first logical disk as well as rate metrics of the second set of rate metrics with respect to the second logical disk, includes rendering a graph depicting (a) a rate metric of the first set of rate metrics with respect to the first logical disk for a particular time interval and (b) a corresponding rate metric of the second set of rate metrics with respect to the second logical disk for the particular time interval.

14. The method of claim 1 wherein the method further comprises:
in response to rendering, receiving a command from the user to alter a configuration characteristic of the data storage system; and
in response to receiving the command, directing the data storage system to alter the configuration characteristic.

15. The method of claim 1 wherein the first set of count-based performance metrics regarding processing by the data storage system of block-based data storage requests includes different metrics than the second set of count-based performance metrics regarding processing by the data storage system of file-based data storage requests.

16. The method of claim 1 wherein:
generating the first set of rate metrics for each respective interval of the first count data includes dividing a count of blocks processed on the first logical disk during that respective interval by the length of that respective interval and multiplying by a block size to yield a transfer speed metric for each respective interval of the first count data, these yielded transfer speed metrics comprising the first set of rate metrics; and
generating the second set of rate metrics for each respective interval of the second count data includes dividing a count of bytes processed on the second logical disk during that respective interval by the length of that respective interval to yield a transfer speed metric for each respective interval of the second count data, these yielded transfer speed metrics comprising the second set of rate metrics.

17. A computer program product comprising a non-transitory computer-readable storage medium storing a set of instructions, which, when executed by a computing device, cause the computing device to administer storage for virtual machines running on a set of host devices, the storage being provided by a data storage system, by, while the data storage system is operating to process storage requests from the virtual machines running on the set of host devices:
receiving, from the data storage system, at respective intervals, first count data over a network, the first count data for each interval including a first set of count-based performance metrics regarding processing by the data storage system of block-based data storage requests directed to a first logical disk during that respective interval, the first logical disk providing storage for a first virtual machine;
receiving, from the data storage system, at respective intervals, second count data over the network, the second count data for each interval including a second set of count-based performance metrics regarding processing by the data storage system of file-based data storage requests directed to a second logical disk during that respective interval, the second logical disk providing storage for a second virtual machine, the second set of count-based performance metrics including counts of different characteristics from those included in the first set of count-based performance metrics;
generating, for each respective interval of the first count data, a first set of rate metrics for the block-based storage requests directed to the first logical disk, the first set of rate metrics being generated based on the first set of count-based performance metrics and a length of that respective interval;
generating, for each respective interval of the second count data, a second set of rate metrics for the file-based storage requests directed to the second logical disk, the second set of rate metrics being generated based on the second set of count-based performance metrics and a length of that respective interval, each rate metric of the second set of rate metrics describing a same performance characteristic in a same format as a corresponding rate metric of the first set of rate metrics; and
rendering, for simultaneous display to a user on a display device, rate metrics of the first set of rate metrics with respect to the first logical disk as well as rate metrics of the second set of rate metrics with respect to the second logical disk.

18. The computer program product of claim 17 wherein the first set of count-based performance metrics regarding processing by the data storage system of block-based data storage requests includes different metrics than the second set of count-based performance metrics regarding processing by the data storage system of file-based data storage requests.

19. A system comprising:
a set of host devices configured to run virtual machines;
a network;
a data storage array configured to:
process storage requests from the virtual machines running on the set of host devices; and
report first count data over the network at respective intervals, the first count data for each interval including a first set of count-based performance metrics regarding processing by the data storage array of block-based data storage requests directed to a first logical disk during that respective interval, the first logical disk providing storage for a first virtual machine; and
report second count data over the network at respective intervals, the second count data for each interval including a second set of count-based performance metrics regarding processing by the data storage array of file-based data storage requests directed to a second logical disk during that respective interval, the second logical disk providing storage for a second virtual machine, the second set of count-based performance metrics including counts of different characteristics from those included in the first set of count-based performance metrics; and
a computing device configured to administer storage for the virtual machines running on the set of host devices by, while the data storage array is operating to process storage requests from the virtual machines running on the set of host devices:
receiving, the first count data from the data storage array over the network at the respective intervals;
receiving, the second count data from the data storage array over the network at the respective intervals;

generating, for each respective interval of the first count data, a first set of rate metrics for the block-based storage requests directed to the first logical disk, the first set of rate metrics being generated based on the first set of count-based performance metrics and a length of that respective interval;

generating, for each respective interval of the second count data, a second set of rate metrics for the file-based storage requests directed to the second logical disk, the second set of rate metrics being generated based on the second set of count-based performance metrics and a length of that respective interval, each rate metric of the second set of rate metrics describing a same performance characteristic in a same format as a corresponding rate metric of the first set of rate metrics; and rendering, for simultaneous display to a user on a display device, rate metrics of the first set of rate metrics with respect to the first logical disk as well as rate metrics of the second set of rate metrics with respect to the second logical disk.

20. The system of claim 19 wherein the first set of count-based performance metrics regarding processing by the data storage array of block-based data storage requests includes different metrics than the second set of count-based performance metrics regarding processing by the data storage array of file-based data storage requests.

* * * * *